United States Patent
Bruckner et al.

(10) Patent No.: US 12,309,252 B2
(45) Date of Patent: May 20, 2025

(54) TIME SYNCHRONIZATION IN A NETWORK

(71) Applicant: B&R INDUSTRIAL AUTOMATION GMBH, Eggelsberg (AT)

(72) Inventors: Dietmar Bruckner, Eggelsberg (AT); Oliver Höftberger, Eggelsberg (AT); Jörg Zelenka, Eggelsberg (AT); Franz Profelt, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 481 days.

(21) Appl. No.: 17/941,223

(22) Filed: Sep. 9, 2022

(65) Prior Publication Data
US 2023/0079221 A1    Mar. 16, 2023

(30) Foreign Application Priority Data
Sep. 10, 2021    (AT) ................ A50715/2021

(51) Int. Cl.
*H04L 7/00*    (2006.01)
(52) U.S. Cl.
CPC .......... *H04L 7/0016* (2013.01); *H04L 7/0012* (2013.01)
(58) Field of Classification Search
CPC ....... H04L 7/0016; H04L 7/0012; G06F 1/12; G06F 1/14; H04J 3/0697; H04J 3/0664
See application file for complete search history.

(56) References Cited

U.S. PATENT DOCUMENTS

| | | |
|---|---|---|
| 10,250,377 B2 | 4/2019 | Wang |
| 10,795,403 B2 | 10/2020 | Falk et al. |
| 2011/0276820 A1 | 11/2011 | Patel et al. |
| 2013/0013952 A1* | 1/2013 | Gotz ............... G04G 7/00 713/400 |
| 2013/0039359 A1* | 2/2013 | Bedrosian ....... H04J 3/0667 370/350 |

(Continued)

FOREIGN PATENT DOCUMENTS

| | | |
|---|---|---|
| DE | 10 2015 205 406 | 9/2016 |
| DE | 10 2018 207 684 | 11/2019 |

(Continued)

OTHER PUBLICATIONS

Austria Search Report conducted in counterpar Austria Appln. No. A 50715/2021 (Sep. 10, 2021).

*Primary Examiner* — Kwang B Yao
*Assistant Examiner* — Patrick Yipao Pei
(74) *Attorney, Agent, or Firm* — GREENBLUM & BERNSTEIN, P.L.C.

(57) ABSTRACT

Method for time synchronization in a network comprising masters and at least one slave. The slave receives synchronization messages from the masters via the network for time synchronization of a first clock and a second clock of the slave. A first master sends a first synchronization message having a first time stamp to the slave for time synchronization of the first clock. The slave calculates a clock rate and a time difference between the first clock and the first master and aligns the first clock with a synchronized time. A second master sends a second synchronization message having a second time stamp to the slave for the time synchronization of the second clock. The clock rate of the second clock is set to the first clock rate. A time difference between the second clock and the second master is calculated and the second clock is aligned with the synchronized time.

7 Claims, 3 Drawing Sheets

(56) References Cited

U.S. PATENT DOCUMENTS

| | | | |
|---|---|---|---|
| 2016/0080533 A1* | 3/2016 | Jeon | H04L 12/66 |
| | | | 370/402 |
| 2018/0006798 A1* | 1/2018 | Bilstad | H04N 21/8547 |
| 2018/0081390 A1 | 3/2018 | Dominguez et al. | |
| 2021/0218656 A1* | 7/2021 | Meier | H04L 12/40 |

FOREIGN PATENT DOCUMENTS

| | | |
|---|---|---|
| EP | 2 544 389 | 1/2013 |
| EP | 3 404 866 | 11/2018 |

* cited by examiner

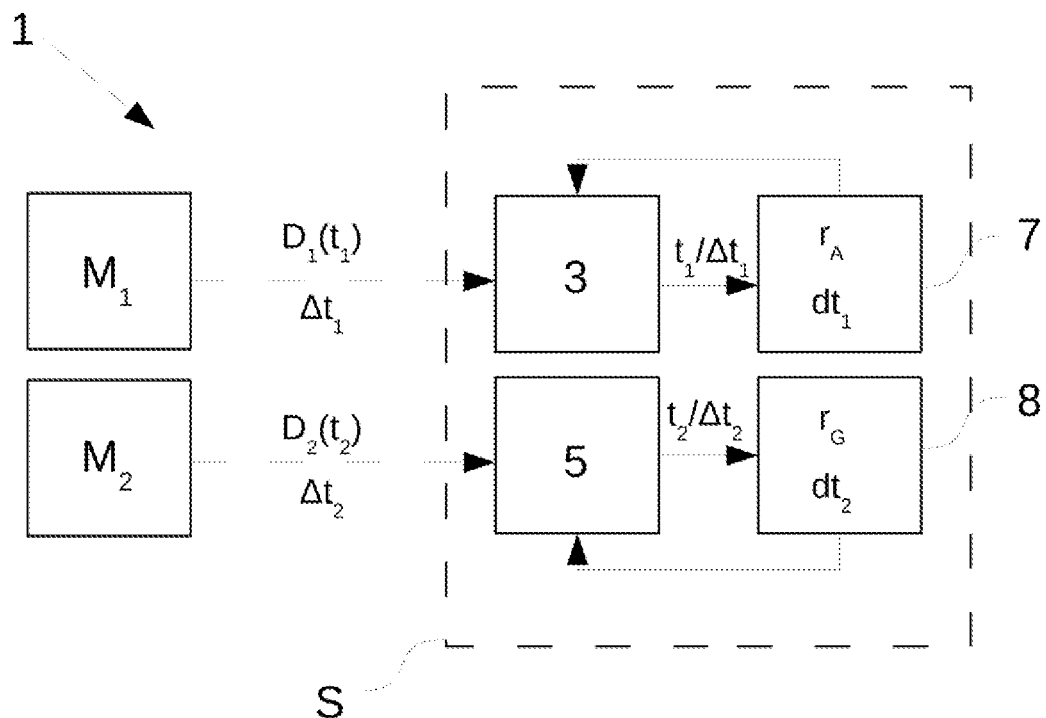
Fig.1 -- Prior Art
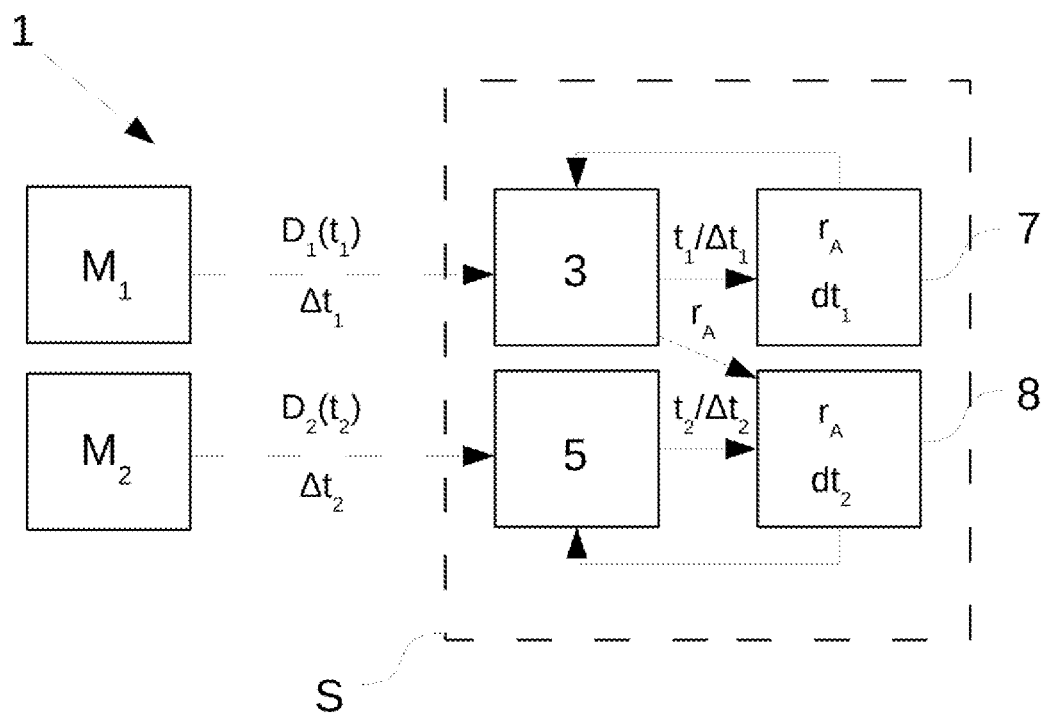
Fig.2

TIME SYNCHRONIZATION IN A NETWORK

CROSS-REFERENCE TO RELATED APPLICATION

This application claims priority under 35 U.S.C. § 119(a) to Austria Application No. A50715/2021 filed Sep. 10, 2021, the disclosure of which is expressly incorporated by reference herein in its entirety.

BACKGROUND

1. Field of the Invention

The present invention describes a method for time synchronization in a network, the network having a plurality of masters and at least one slave, the at least one slave receiving synchronization messages from the plurality of masters via the network for the time synchronization of a first clock and a second clock of the slave, a first master sending a first synchronization message having a first time stamp to the at least one slave for the time synchronization of the first clock and the at least one slave comparing the first time stamp of the first synchronization message with the first current time of the first clock and, based on this comparison, calculating a clock rate and a time difference between the first clock and the first master and carrying out a time alignment, as a result of which the first clock in the slave runs with a synchronized time, a second master sending a second synchronization message having a second time stamp to the at least one slave for time synchronization of the second clock.

2. Discussion of Background Information

In principle, completely different hardware components such as central processing units, bus modules, drive modules, bus couplers, IO modules having integrated network connections, cameras, HMI devices, network-integrated sensors and actuators, network infrastructure (switches, bridges, etc.) etc., can be provided as network subscribers of a network. Each network subscriber in a network has at least one clock that is used to control the work processes in the network subscriber itself. For example, this clock can specify the usable CPU time of each process. Workflows between network subscribers in the network are also aligned using the clock. This allows different processes to be controlled in a network.

In principle, a distinction is made between hardware-based clocks and logical clocks. Hardware-based clocks are, for example, quartz oscillators having counting registers, the quartz oscillator specifying regular oscillations that are then recorded by the counting register. These are dependent on physical variables such as temperature, air pressure, ambient humidity, etc. Therefore, the location of a network subscriber can affect the quartz oscillator and these changes can result in different clock or frequency rates of a hardware-based clock. While this often has no consequences for an isolated network subscriber, time synchronization between the clocks of different network subscribers that run at different clock rates can become necessary in the network.

In the case of a logical clock, the clock signal comes from the hardware, such as a hardware-based clock, via an interrupt request. The logical clock must therefore first be set after switching on a network subscriber. A logical clock is a component of a computer system that can be used to give events, such as workflows in a network, a unique time stamp.

A time stamp is used to assign a unique point in time to an event. The accuracy of this time stamp largely depends on the accuracy of a clock. Events are, for example, various physical workflows in a production plant, but they can also be of a digital nature, such as communication between different network subscribers. Movements of machine parts or goods, for example on a machine, can take place as physical workflows. The physical workflows can be initiated or executed by network subscribers designed as actuators and recorded by network subscribers designed as sensors. In the event of a production failure, for example, it is possible to tell exactly which machine was responsible for a failure and at what point in time. This significantly simplifies troubleshooting in highly complex production systems.

Often there is not only one clock in a network subscriber, but a plurality of clocks. The clocks can be in the form of hardware-based clocks and logical clocks or combinations thereof. For example, two logical clocks can use the same hardware-based clock. At least one hardware-based clock is usually installed in a network subscriber, which clock indicates at least one working time in the network subscriber. As a rule, such a working time continues to count continuously from a first initialization, for example in fractions of a second. In such a clock, the quartz oscillator acts as a clock generator. To ensure that this clock does not stop when the device is switched off, the clock can be constantly supplied with energy from an energy store, i.e., a battery or a rechargeable battery. In the event of a loss of power, for example if the button battery on the motherboard is dead, this clock would then start counting again when a new power source is used.

For example, a logical clock now uses the hardware-based clock mentioned above to control workflows and give events a time stamp.

Unavoidable inaccuracies can occur in a network, for example because the built-in quartz oscillators do not oscillate at exactly the same frequency due to manufacturing inaccuracies. Furthermore, different locations of the network subscribers can cause the frequency difference in the quartz oscillators to arise or increase due to external influences. Network subscribers can be located together in a machine hall, or they can also be spatially separated from each other. For example, temperature differences caused by different outside temperatures, air conditioning and CPU heating can have an impact on the quartz oscillator.

In order to allow time-controlled communication by means of different network subscribers, it is necessary to compare clocks that have different times. In the simplest case, one network subscriber in the network is designated as a master and the other network subscribers are designated as slaves. A network subscriber that is a master can be a particularly powerful and fail-safe network subscriber. The master then specifies the time for the slaves in the network and uses it to regulate the time synchronization. As a rule, there are a plurality of masters in a network. There is a master for time synchronization for each time. When there are two clocks there are therefore two masters. Although they can be on a physical network subscriber, they can also be divided between different network subscribers. It may also be possible for the master roles between network subscribers to change regularly.

However, there is often not just one master for a clock in a network, but rather a plurality of masters, referred to as "standby masters." As long as the original master carries out the time synchronization with respect to a clock, the standby masters behave like slaves. If the first master fails, one of the standby masters can take over and carry out the time synchronization.

The network subscribers often use a working time as the time, which working time runs continuously from the initialization of the system. However, it is not only important to compare the working time for network subscribers, but a global time is also often required. In particular, global time means the time normally perceived by humans with a date and a time. Such a global time can be important for users, for example employees in production facilities, for example for maintenance, commissioning and troubleshooting for a network subscriber in a network. For this purpose, as is known in the case of the working time, a network subscriber can again be designated as a master and the others are slaves that receive time synchronization from the master. For the global time, a master can connect to a Coordinated Universal Time (UTC) server or International Atomic Time (French: TAI) server via the Internet or via radio or GPS.

Furthermore, with regard to other tasks, masters for time synchronization can only be simple network subscribers or slaves. In the present invention, the terms "master" and "slave" relate exclusively to time synchronization in a network and not to other functionalities, such as in a production process.

The masters for time synchronization of working time and global time are usually not identical in a network. A separate time synchronization to the working time and to the global time of different masters can thus be provided for the network subscribers. For this purpose, time synchronization methods are known, which are based on extensive software stacks, as provided, for example, in the Precision Time Protocol (PTP) protocol. Such protocols are given, for example, in the IEEE 802.1AS-2020 standard. The working time and global time are each aligned separately. As a rule, a plurality of redundant masters can specify both the working time and the global time.

As a rule, such an alignment takes place via synchronization. A complete adjustment of the time, either the working time or global time, is carried out between the master and slave. The slave aligns the clock rate as well as the time difference. The time difference is the concrete difference between the time of the master and the time of the slave. For example, a master has a global time of 1:02 p.m. and a slave has a global time of 1:05 p.m. The time of the slave is now set from 1:05 p.m. to 1:02 p.m. and the slave aligns the clock rate based on the knowledge of the time in the master so that the clocks run at the same speed. Precise alignment of the clock rates can only be possible after a certain number of synchronization messages.

In order to avoid time jumps as far as possible, the clock rate of the slave can be accelerated or delayed such that the clocks in the master and slave are aligned. However, this process can take a long time if there are large deviations between the master and slave and can lead to persistent errors, especially in the clock rate. On the other hand, if a time is adjusted abruptly, errors may occur in the time stamps. Events that actually happened one after the other have the same time stamp after the time synchronization, or the logged sequence of these events can even be mixed up.

However, alignment can also be carried out via syntonization. Syntonization is understood solely as the alignment of the clock rate between a master and a slave in a network, without any alignment of a time difference, as used in the case of synchronization. As in the example above, the times would not be corrected to the time of the master by means of a jump, but would instead continue to run with the same difference or be aligned with one another at an accelerated or delayed clock rate. This prevents jumps in the clock and also avoids incorrect assignment of events. However, this at least prevents the difference from becoming larger if both clocks have the same clock rate. In the alignment according to the invention, both synchronization and syntonization can subsequently be provided. This can depend on the difference between the at least one slave and the master and on the area of application.

The working time and the global time are usually aligned using different masters. As a result, it is possible for these two times to run at different speeds, i.e., to have a different clock rate. Events can have the time stamp of the working time as well as the global time, for example, depending on whether an event represents a production process and communication between network subscribers is required or an interaction with a user takes place.

The current prior art for time synchronization is the IEEE's PTP standard. This standard provides that each clock in a network subscriber is synchronized separately with a master via the network. For example, a working clock based on the standard can be aligned with other working clocks in the network. The same procedure can be performed for a global clock. This means that a clock rate and a time difference, for example, are specified for the clock. Different clocks in a network subscriber can thus sometimes have different clock rates. If a network subscriber communicates with other network subscribers, for example with other slaves or with a master in the network, this can lead to an accumulation of errors in the time logging that can no longer be traced.

Many existing applications use one of these two clocks to control time sequences (e.g. as a timer for the execution of certain events). Because each of these clocks is synchronized with the clock rate of a master in the prior art, the control of the time sequences does not run at the clock rate of a single clock, which would be necessary for the network-wide clocked execution of events.

EP 2 544 389 B1 discloses time synchronization of the working time and global time, the difference between these two times being recorded and the difference being passed on by means of a message from a master to a subscriber in the system and the slave correcting its times. Due to the difference, the clocks are adjusted to each other. The disadvantage of this method is that there must be a common master for both clocks. Furthermore, this method requires additional information that must be transmitted. This means that all components in the network must use the same method.

SUMMARY

Embodiments of the present invention allow uniform time synchronization for different applications during operation.

In embodiments, the clock rate of the first clock is used to specify a clock rate for the second clock by the clock rate of the second clock being set to the clock rate of the first clock. The at least one slave then compares the second time stamp of the second synchronization message with the second current time of the second clock, calculates a time difference between the second clock and the second master based on this comparison and carries out a time alignment in such a way that the second clock in the slave runs with the synchronized time.

This is advantageous because there are often standard mechanisms in the hardware and operating system that assign an application a fixed clock in a network subscriber. Especially on Linux-based systems, applications such as a timer or a "monotonic clock" are associated with the global time. This can lead to problems, especially in complex production processes, because many network subscribers use different clocks for the applications, such as the timer, or even have only one clock in the system, which is then usually a working clock. Furthermore, there can sometimes be interruptions in the global clock because it is synchronized with TAI or UTC via GPS by default in the associated master.

It is possible to manually set the preferred clock for each application, but this would involve a great deal of effort. Furthermore, the advantage of a second clock, such as the global clock, which can be valuable for logging entries, certificates or error messages, is lost. It is therefore advantageous for the processes that are important for the network to be controlled via the working clock, but the global clock is still available and can be used.

The time synchronization according to the invention relates to a network having different network subscribers. A network subscriber can, for example, be a PC for controlling a test bench, a production machine, a transport system, but also bus modules, drive modules, bus couplers, IO modules having integrated network connections, camera, HMI devices, network-integrated sensors and actuators and network infrastructure (switches, bridges, etc.). There is a plurality of masters for time synchronization in each network. A master role is provided for each clock. The master roles can be present on one physical network subscriber, but the master roles can also be distributed among different network subscribers.

Other clocks in the network subscribers then act as slaves with regard to time synchronization. According to the invention there is at least one first clock and one second clock in the slave. These clocks can have a different time base, such as a classic time, days and hours, or a clock can only continue to count in seconds or in fractions of seconds (e.g. microseconds or nanoseconds) from an initialization time. The slaves receive synchronization messages from the plurality of masters to carry out synchronization. A master can often also be supported by other "standby" masters. As long as the master actively specifies the time synchronization, the standby masters act like slaves. If communication with the master fails, the standby masters can take over the time synchronization. A network failure can have a data transfer-based reason, for example, or a physical reason, for example due to a line being severed, for example during construction work.

A working time and a global time in a network can be provided as times, for example. A first clock then runs, for example, as a working clock having a working time, and a second clock as a global clock having a global time. In principle, however, other times are also possible, such as a production time, a batch time and the like. A working time is often a scalar, which, for example, continues to count from an initialization time. This can lead to figures that are cumbersome to read and interpret because no standardized time representation can be used for the working time. Therefore, a global time, in contrast to a working time, can often be designed to be user-friendly and indicate a readable time with the date and time. Coordinated universal time (UTC) or international atomic time (French: TAI), for example, can be used as global times in the network. A master uses a GPS connection, for example, to align itself with TAI or UTC. If different parts of a network use different global times, a "conversion" can be used to convert between these different global times. This conversion of the different global times can take place, for example, via a Portable Operating System Interface (POSIX) based algorithm. For example, ISO 8601:2004 describes the conversion from TAI to UTC.

In other embodiments, a slave receives a first synchronization message from the first master, with which the working clock in the slave is synchronized in a first step. A time jump may be necessary, for example, after starting a network subscriber, because there is then a large time difference. The synchronized clock rate of the working clock is used to set the clock rate for the global clock in the slave. However, the global clock is still updated by the second synchronization message from the second master and, for example, adjusted to TAI. Consequently, the global time is correct at the times of the synchronization messages, but may deviate slightly between the synchronization messages due to the specification of the clock rate of the working clock. However, because the global clock is synchronized several times per second, this deviation can be irrelevant for applications with user interaction. Such differences are in the lower microsecond range and smaller, and are usually perceived by humans as simultaneous.

An advantageous time synchronization takes place in intervals of between 10 and 200 ms.

For example, time synchronization is carried out regularly in the preferred range of 10-200 ms. However, irregular intervals are also conceivable. For example, the time synchronization can be intensified during a production process and otherwise run at a different interval, or irregularities can occur due to the exchange of a master role in the network.

In advantageous embodiments, a slave can also contain a time stamper that is associated with a first clock and/or with a second clock and assigns a time stamp to a data packet.

Such time stampers assign a time stamp of the associated clock to an outgoing event. This can be advantageous, for example, for targeted data traffic using data packets in the production process, an event then receiving the time stamp of the associated clock, such as a working clock.

In an advantageous embodiment, time synchronization can take place in at least one slave via synchronization and a clock rate and a time difference can be calculated, and the time difference between the first clock and/or the second clock and the master can be compensated for by a time jump and/or a frequency alignment.

Synchronization is advantageous if the clock rate and the time difference between two clocks are aligned. Then, two clocks, for example a working clock and a global clock, display the same time.

In a further advantageous embodiment, time synchronization can take place in at least one slave via syntonization and a clock rate and a time difference can be calculated, and the time difference between the first clock and/or the second clock and the master can be compensated for by adjusting the clock rate.

Syntonization can be sufficient if two clocks should have the same clock rate, but the difference does not need to be reconciled. A wide variety of times in a network can be aligned with a large number of network subscribers. Preferably, the plurality of masters sends a synchronization message for each clock, for example 8 or 32 times per second.

In a preferred embodiment, a timer is associated with a first clock and/or with a second clock and issues an interrupt request (UA) at regular intervals.

A timer controls cyclic processes in a system by issuing an interrupt request at regular intervals (e.g. 1 millisecond (ms)). This can be important for current and future events that should be triggered by a predefined interrupt request from the timer. With time synchronization according to the invention, a timer can be associated with both the working clock and the global clock, and issues correct interrupt requests.

Embodiments are directed to a method for time synchronization in a network. The network includes a plurality of masters and at least one slave having a first and second clock, and the at least one slave receives synchronization messages from the plurality of masters for time synchronization of the first clock and the second clock of the slave via the network. The method includes sending a first synchronization message having a first time stamp from a first master to the at least one slave for time synchronization of the first clock and the at least one slave, and comparing the first time stamp of the first synchronization message with the first current time of the first clock. Based on this comparison of the first time stamp of the first synchronization message with the first current time of the first clock, the method includes calculating a clock rate and a time difference between the first clock and the first master and carrying out a time alignment in such a way that the first clock in the slave runs with a synchronized time. The method also includes a second master sending a second synchronization message having a second time stamp from the second master to the at least one slave for the time synchronization of the second clock, in which a clock rate of the first clock is used to specify a clock rate for the second clock, by setting the clock rate of the second clock to the clock rate of the first clock, and comparing, in the at least one slave, the second time stamp of the second synchronization message with the second current time of the second clock. Based on this comparison in the at least one slave, the method includes calculating a time difference between the second clock and the second master and carrying out a time alignment in such a way that the second clock in the slave runs with the synchronized time.

In embodiments, the time synchronization can take place at intervals of between 10 and 200 ms.

According to embodiments, a time stamper can be associated with at least one of the first clock or the second clock of the at least one slave and may assign a time stamp to a data packet.

In accordance with other embodiments, the time synchronization can take place in the at least one slave via synchronization and a clock rate and a time difference may be calculated, and the time difference between at least one of the first clock or the second clock and the master can be compensated for by at least one of a time jump or a frequency alignment.

According to still other embodiments, the time synchronization may take place in at least one slave via syntonization and a clock rate and a time difference can be calculated, and the time difference between the at least one first clock or the second clock and the master can be compensated for by adjusting the clock rate.

In accordance with still yet other embodiments, a timer may be associated with at least one of the first clock or the second clock and issue an interrupt request at regular intervals.

Embodiments are directed to a network that includes a plurality of masters and at least one slave, the plurality of masters and the at least one slave each having a first clock and a second clock. The first master is configured to send a first synchronization message having a first time stamp to the at least one slave, and the at least one slave being designed to calculate a clock rate and a first time difference relative to the first current time of the first clock in relation to the first master on the basis of the first time stamp and to carry out a time alignment in such a way that the first clock in the slave runs with a synchronized time. The second master is configured to send a second synchronization message having a second time stamp to the at least one slave. The at least one slave is designed to specify the clock rate of the first clock as a clock rate for the second clock, and to set the clock rate of the second clock to the clock rate of the first clock. The at least one slave is designed to calculate a second time difference between the second current time of the second clock and the second master on the basis of the second time stamp and to carry out a time alignment in such a way that the second clock in the slave runs with the synchronized time.

Other exemplary embodiments and advantages of the present invention may be ascertained by reviewing the present disclosure and the accompanying drawing.

BRIEF DESCRIPTION OF THE DRAWINGS

The present invention will be explained in greater detail in the following with reference to FIG. 1 to 5, which show exemplary advantageous embodiments of the invention in a schematic and non-limiting manner. In the drawings:

FIG. 1 is a flowchart for time synchronization in the prior art;

FIG. 2 is a flowchart for time synchronization according to the invention;

DETAILED DESCRIPTION

Figure 3:
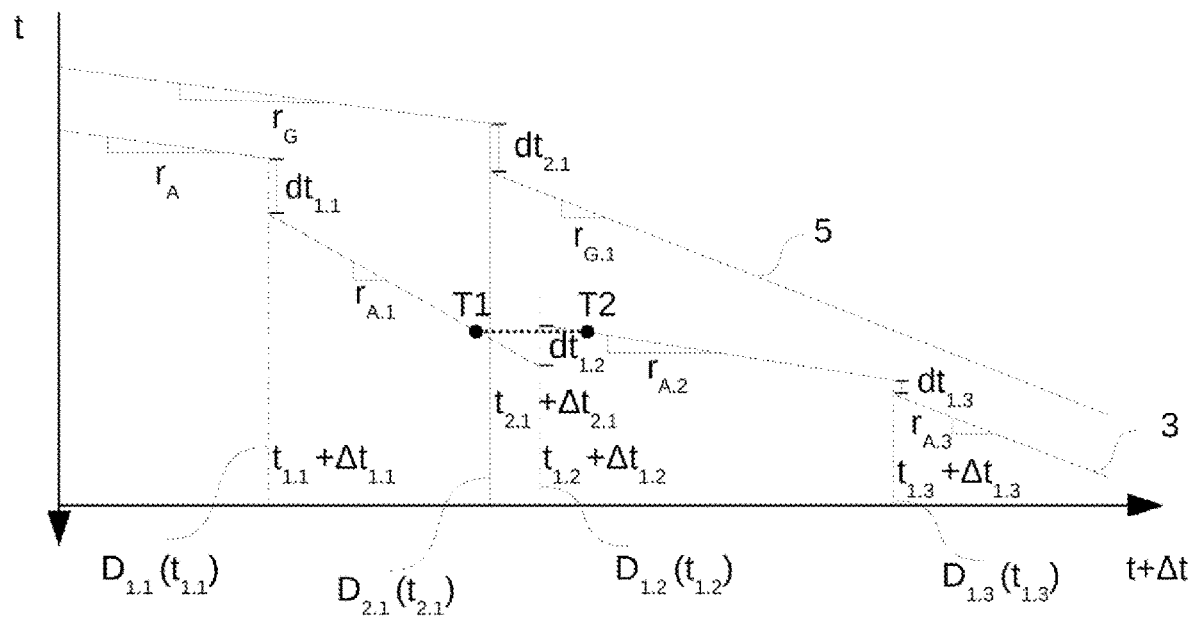
FIG. 3 shows schematic time synchronization of the clocks in the slave in the prior art.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a prior art method for data transfer for time synchronization in a network 1 having network subscribers. Different roles for time synchronization are distributed in a network 1. In a network 1 there are network subscribers having the role of master M and slave S. According to the invention, at least two clocks are provided. However, a plurality of clocks can also be present and be subject to time synchronization. In the case of time synchronization according to the invention, there is at least one first clock and one second clock. The first clock runs with a first time and the second clock with a second time.

To illustrate this, a working clock 3 is shown representatively for a first clock and a global clock 5 is shown representatively for a second clock. However, completely different clocks could also run in a network and on network subscribers, for example a production clock, a batch clock, etc. For synchronization, the role of a master $M_1$ is assigned for the working time and the role of a master M2 is assigned for the global time. In principle, both masters $M_1$ and M2 can be run on the same network subscribers, but are often distributed to different network subscribers. All other working clocks 3 and global clocks 5 in a network are then considered slave clocks. According to the invention, a slave S contains a working clock 3 that outputs a first time as the working time and a global clock 5 that outputs a second time as the global time. The global time can usually be the time of an atomic clock such as TAI or UTC, which should be the same everywhere in the world, depending on the time zone. However, it can also be possible for a slave S to contain only a single clock. This can then often be a working clock 3, and there is no synchronization with the global time. The clocks of the present invention can constitute any combination of hardware-based and logical clocks. For example, both the working clock 3 and the global clock 5 can access the same hardware-based clock, but both the working clock 3 and the global clock 5 can each access a hardware-based clock.

The network subscribers are connected to each other via network lines. The network lines often form a data bus for data communication between the network subscribers. The network lines can be LAN cables, network buses, fiber optic cables and the like, which allow communication in the network between the network subscribers. Any communication protocol can be implemented for data communication. A network infrastructure can also be provided that connects different networks or different portions of a network to one another, for example switches, routers, etc. Wireless data traffic having time synchronization via a wireless network, such as wireless LAN (WLAN), is also conceivable in a network 1 or in parts of a network 1. Any network topologies for the network 1 that are familiar to a person skilled in the art and that allow targeted data transfer with time synchronization between the network subscribers are possible. In terms of data traffic (in addition to other data messages), the network 1 allows bidirectional sending and receiving of synchronization messages between different network subscribers.

The synchronization messages are exchanged between network subscribers in the network 1 for time synchronization. For this purpose, one of the masters $M_1$, $M_2$ regularly sends synchronization messages $D_1$, $D_2$ to the at least one slave S. The master $M_1$ sends a synchronization message $D_1$ to synchronize the working clock 3, and the master $M_2$ sends a synchronization message $D_2$ to synchronize the global clock 5. The synchronization messages $D_1$, $D_2$ can be sent in one data packet, i.e., in a closed data unit that is intended for network traffic, but the synchronization messages $D_1$. $D_2$ can also be sent independently of one another in different data packets in the network 1. The synchronization messages $D_1$ for the working clock 3 are preferably sent at a higher interval than the synchronization messages $D_2$ for the global clock 5. The working clock 3 can often be synchronized four times as often compared to the global clock 5.

The synchronization message $D_1$ contains a time stamp $t_1$ from the master $M_1$ and the synchronization message $D_2$ contains a time stamp $t_2$ from the master $M_2$. A time stamp $t_1$, $t_2$ is the time of a working clock 3 or global clock 5 of a master at the time a synchronization message D is sent. The synchronization messages $D_1$, $D_2$ are used to calculate a clock rate r and a time difference dt in the slave S relative to the master $M_1$, $M_2$ and to set the working clock 3 or global clock 5 in such a way that the working time and global time are the same as those of the master and continue to run in the same manner.

The clock rate r defines a periodic signal that is determined by its frequency or period duration and is often used to coordinate the timing of processes in a digital system. A clock rate r can be output by a quartz oscillator in a hardware-based clock, for example. The time difference dt describes the absolute difference between two times. For example, a global time can be 11:23 a.m. on the master M and a global time on the slave S can be 11:25 a.m. The time difference dt would then be 2 minutes or 120 seconds.

FIG. 1 shows the flow of synchronization in the prior art. The master $M_1$ sends a synchronization message $D_1$ via the network to at least one slave S at specific points in time that can be predetermined or can also result, for example, from a change of a master $M_1$. The synchronization message $D_1$ receives a time stamp $t_1$ and has a runtime in the network of $\Delta t_1$. The runtime can be considered to be known or can at least be estimated. By default, the runtime $\Delta t_1$ can be measured by separate messages. The synchronization message $D_1$ arrives at a slave S, for example at a network port in the slave S, and is passed on to the working clock 3. As a rule, a time synchronization mechanism 7, 8 in each slave S, for example in a clock, calculates the deviations from the master $M_1$, $M_2$. The working clock 3, or the time synchronization mechanism of the working clock 7, now uses the time stamp $t_1$ and the known runtime $\Delta t_1$ to calculate the clock rate r1 and the time difference dt1 for its own working clock 3 and carry out a time alignment. If there are large deviations between the master $M_1$ and the working clock 3 in the slave S, a time jump is carried out and the clock rate $r_A$ is also aligned. An alignment of the clock rate $r_A$ means that the duration of a clock in the slave S and in the master is the same after the alignment, and the time thus advances in the same way. Such an alignment of the clock rate $r_A$ can, for example, only be possible after a specific number of synchronization messages $D_1$. For example, in the case of small deviations, it may only be necessary to adjust the clock rate $r_A$, for example to accelerate or decelerate it. For this purpose, the clock rate r can be accelerated for a certain period of time in order to compensate for a difference, and can then, for example, allow 1.2 seconds to pass instead of 1 second per clock beat. Of course, the technically usual clock rates are in substantially lower ranges, for example 8-10 ns (nanoseconds). In the case of small differences, an adjustment of the clock rate r (frequency adjustment) can be sufficient.

The master $M_2$ also sends a synchronization message $D_2$ to the global clock 5 in the slave S. The synchronization message $D_2$ receives a time stamp $t_2$ from the master $M_2$ and has a runtime $\Delta t_2$ that can again be considered to be known. Due to the fact that the roles of the masters M can be executed on different network subscribers, the runtimes of the synchronization messages $D_1$, $D_2$ can definitely differ. However, different runtimes can also result, for example, from the fact that the synchronization messages $D_1$, $D_2$ are sent via different network paths. The global clock 5 or the time synchronization mechanism of the global clock 8 in the slave S calculates the clock rate $r_G$ and the time difference $dt_2$, as described above for the first synchronization message $D_1$. This can be done via a time jump or a frequency adjustment, depending on the deviation between the master M2 and the global clock 5 in the slave S.

In the prior art, there is therefore no interaction between the working clock 3 and the global clock 5. Each is synchronized individually by the respective master $M_1$, $M_2$. Due to the time synchronization using the first synchronization message $D_1$ and the second synchronization message $D_2$, it can happen that both the working clock 3 and the global clock 5 execute time jumps forward or backward and/or a clock rate $r_A$, $r_G$ of one or each of the two clocks, i.e., working clock 3 and/or global clock 5, is accelerated or decelerated in order to compensate for a time difference relative to one of the masters $M_1$, $M_2$. The time synchronization in the prior art can therefore result in the working clock 3 and the global clock 5 having different clock rates $r_A$ and $r_G$.

FIG. 3 shows an exemplary time course during regular time synchronization of the working clock 3 and the global clock 5 in the prior art. Time differences dt and clock rates r are always relative to a master $M_1$, $M_2$. The ordinate describes the time course of the time stamps $t_1$, $t_2$ and the abscissa describes the arrival of new synchronization messages D(t) from the master M as a function of the time and the runtime t+Δt. The arrival of the synchronization messages is not the same, but depends on the synchronization intervals of the masters $M_1$ and $M_2$. The working clock 3 and the global clock 5 each initially run at clock rates $r_A$ and $r_G$. The master $M_1$ sends the first synchronization message $D_{1.1}$ with a time stamp $t_{1.1}$ and said synchronization message arrives at the slave S after the runtime $\Delta t_1$. The slave S compares the time stamp $t_{1.1}$ of the first synchronization message $D_{1.1}$ with the working time of the working clock 3 and uses the time synchronization mechanism 7, for example the working clock 3, to calculate a new clock rate $r_{A.1}$ and, based on the deviations of the working clock 3 from the time stamp $t_{1.1}$, a time difference $dt_{1.1}$ for the working clock 3. The global clock 5 has not yet received a synchronization message and continues to run at clock rate $r_G$. Depending on the calculated time difference $dt_{1.1}$, the working clock 3 jumps as a result of the synchronization and changes the clock rate $r_{A.1}$. Next, in this example, the slave S receives a synchronization message $D_{2.1}$ from the master $M_2$ for the global clock 5. Via the time stamp $t_{2.1}$ of the synchronization message $D_{2.1}$, a clock rate $r_{G.1}$ and time difference $dt_{2.1}$ is calculated with the global clock time synchronization mechanism 8. As a result, the global clock 5 jumps and changes the clock rate $r_{G.1}$ in FIG. 3, which can be seen from the gradient in FIG. 3. In a preferred embodiment, a jump is performed only after the first synchronization message from both the working clock 3 and the global clock 5, and later synchronization messages $D_1$, $D_2$ can only cause a change in the clock rate $r_A$, $r_G$. The process repeats itself at different times. The runtimes Δt can differ between the different synchronization messages, for example if a different master M is specified, but are known to the slave S.

This process can be repeated as long as synchronization messages $D_1$, $D_2$ are sent from the master $M_1$, $M_2$ to the slave S for time synchronization. Identical points in time on the ordinate for the same clock with the same value would have the same time stamp t and would then no longer be distinguishable. This is indicated by way of example in FIG. 3 for working clock 3 with time stamps $T_1$ and $T_2$. Events that have this time stamp t, i.e. $T_1$ and $T_2$, would generally no longer be distinguishable with regard to the time base.

FIG. 2 shows the time synchronization according to the invention in a network 1. As described above, a master $M_1$, $M_2$ sends a first and a second synchronization message $D_1$ and $D_2$. In the case according to the invention, the first synchronization message $D_1$ also contains a time stamp $t_1$ so that the slave S can align the working clock 3. The second synchronization message $D_2$ contains a time stamp $t_2$ in order to align the global clock 5. The global clock 5 always calculates the time difference $dt_2$ relative to a global time specified by a master $M_2$. Both take place via the time synchronization mechanisms 7, 8. Consequently, the global time is aligned between the master $M_2$ and the slave S with each synchronization message $D_2$. However, the clock rate $r_G$ of the global clock 5 is not adjusted via the synchronization message $D_2$.

The clock rate $r_A$ of the working clock 3 is now used to specify the clock rate $r_A$ for the global clock 5. Thus, the clock rate $r_A$ of the working clock 3 corresponds to the clock rate $r_G$ of the global clock 5, i.e., $r_A=r_G$. As a result, the clock rates $r_A$, $r_G$ in the slave S are aligned internally via the specification from the working clock 3 and not, as before, via a specification from the master $M_2$, which sent a second synchronization message $D_2$ to the slave S. As a result, there are no different clock rates $r_A$, $r_G$ between the working clock 3 and the global clock 5, as in the prior art. This is advantageous because applications such as a timer or a "monotonic clock," which can be associated with either the working clock 3 or the global clock 5, now always access the same clock rate $r_A=r_G$.

In an extremely illustrative example, the clock rate $r_A$ of the working clock, which is calculated on the basis of the first synchronization message $D_1$, can only run at 90% of the speed compared to the clock rate $r_G$ of a global clock 5. After a second synchronization message $D_2$, for example at 1:00 a.m., the global clock 5 is aligned to the global time with the master $M_2$. In the example, the clocks do not receive any synchronization messages for one hour until 2:00 a.m. Because the clock rate $r_A$ is aligned to $r_G$, only 56 minutes have passed in the slave S in the global clock and said global clock would now display a time of 1:56 a.m., although it is now 2:00 a.m. With the next second synchronization message $D_2$ at 2:00 a.m., the global clock is set to the value 2:00 a.m. and is therefore again synchronous with the global time.

The global clock 5 therefore often performs time jumps on the basis of the second synchronization message $D_2$. These time jumps can be substantially smaller than the resolution of a global clock 5, and of course not have the size (4 minutes) as in the example above. For example, the resolution of the global clock 5 can be in the range of 1 microsecond (μS), but the time jumps, which are calculated on the basis of the incoming second synchronization messages $D_2$, can be in the range of less than 1 μS. Thus, such time jumps can be irrelevant for applications and uses related to a user because these small deviations are perceived by a human being as being at the same time.

Figure 4:
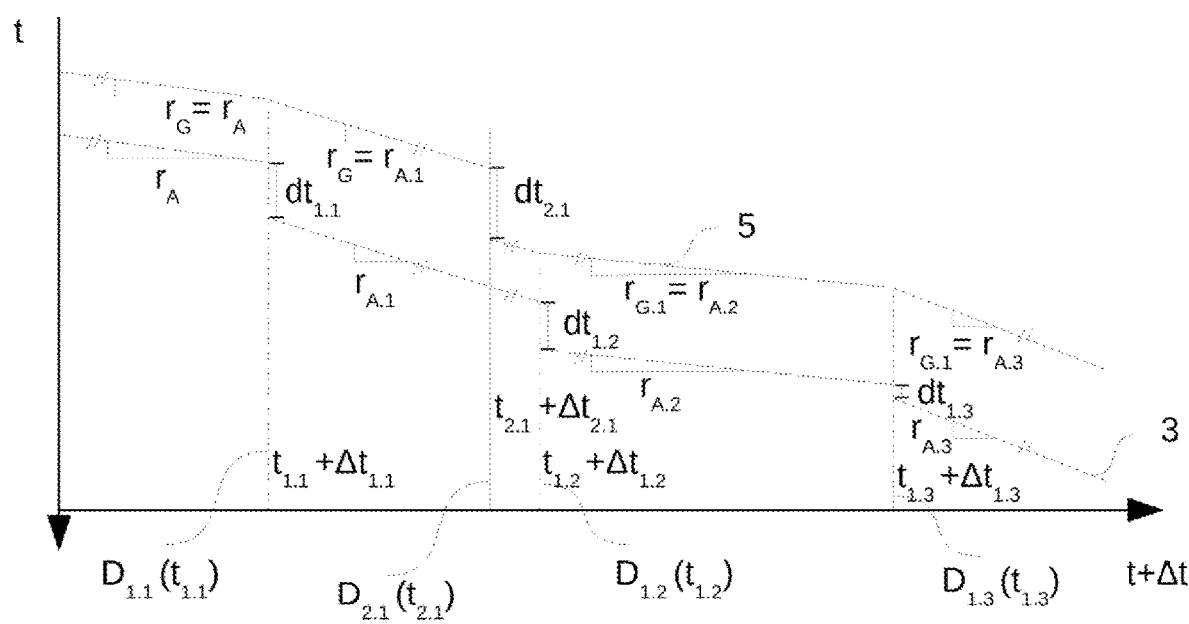
FIG. 4 shows schematic time synchronization according to the invention of the clocks in the slave.

FIG. 4. shows an example of a time course during time synchronization according to the invention, which can take place, for example, regularly or at certain defined time intervals. The ordinate describes the course of time t and the abscissa describes the arrival of new synchronization messages D(t) from a master $M_1$, $M_2$ as a function of the time and the runtime t+Δt. Before the time synchronization according to the invention, for example after initialization of the network 1, the working clock 3 and global clock 5 can run at different clock rates $r_A$ for the working clock 3 and $r_G$ for the global clock 5, which is not shown in FIG. 4. The first synchronization message $D_{1.1}$ with the time stamp $t_{1.1}$ arrives at the slave S after the runtime $\Delta t_{1.1}$ and the working clock 3 calculates a new clock rate $r_{A.1}$. In a preferred embodiment, the working clock 3 can also calculate a working time difference $dt_{1.1}$ with the first synchronization message $D_{1.1}$ and performs a time jump, as already described above. As a rule, time jumps can subsequently be dispensed with because the deviation between the master $M_1$ and the working clock 3 in the slave S is small enough, and then only a frequency alignment takes place. The clock rate $r_G$ of the global clock 5 in FIG. 4 is adjusted according to the invention to the clock rate $r_A$ of the working clock 3, which can be seen from the parallel gradients in FIG. 4. In this area it can also be possible for the global clock 5 to run incorrectly, as described above in the illustrative example. However, the global time is accurate again at the point in time at which the second synchronization message $D_2$ arrives.

After a further time, the synchronization message $D_{2-1}$ from the master $M_2$ reaches the slave S. The time synchronization mechanism 8, for example the global clock 5, calculates the global time difference $dt_{2-1}$ via the second synchronization message $D_2$. At the time of processing by the synchronization mechanism 8, the global time is identical to the global time received from the master $M_2$. It then continues to run at the clock rate $r_A$ of the working clock. This procedure is repeated with the arrival of each first and second synchronization message $D_{1-n}$ and $D_{2-n}$ for time synchronization from the masters $M_1$ and $M_2$.

The slave S can also send data traffic into the network 1, for example via data packets Dp, which can control various events and not only act with regard to time synchronization. A data packet can use a network port for this purpose, for example. For most applications it may be necessary to give the data packet a time stamp t. This can be done via a time stamper in the slave S, which gives an outgoing data packet a time stamp t of the slave S. A time stamp t is the time of the working clock 3 or the global clock 5 in the slave S at the time of the data packet. The time stamp t can also be important for regulating data traffic in a network 1. Depending on the event, the working clock 3 can access a working time stamper or the global clock 5 can access a global time stamper. If an event is to receive a time stamp t from the working clock 3, this is carried out by the working time stamper. In the case of the global clock 5, this functionality is taken over by the global time stamper. For example, the global time stamp $t_5$ of the global clock 5 can be used for events with proximity to a user, while the working time stamp $t_3$ of the working clock 3 can be used for communication events between network subscribers, for example for events such as coordinated production interactions.

Figure 5:
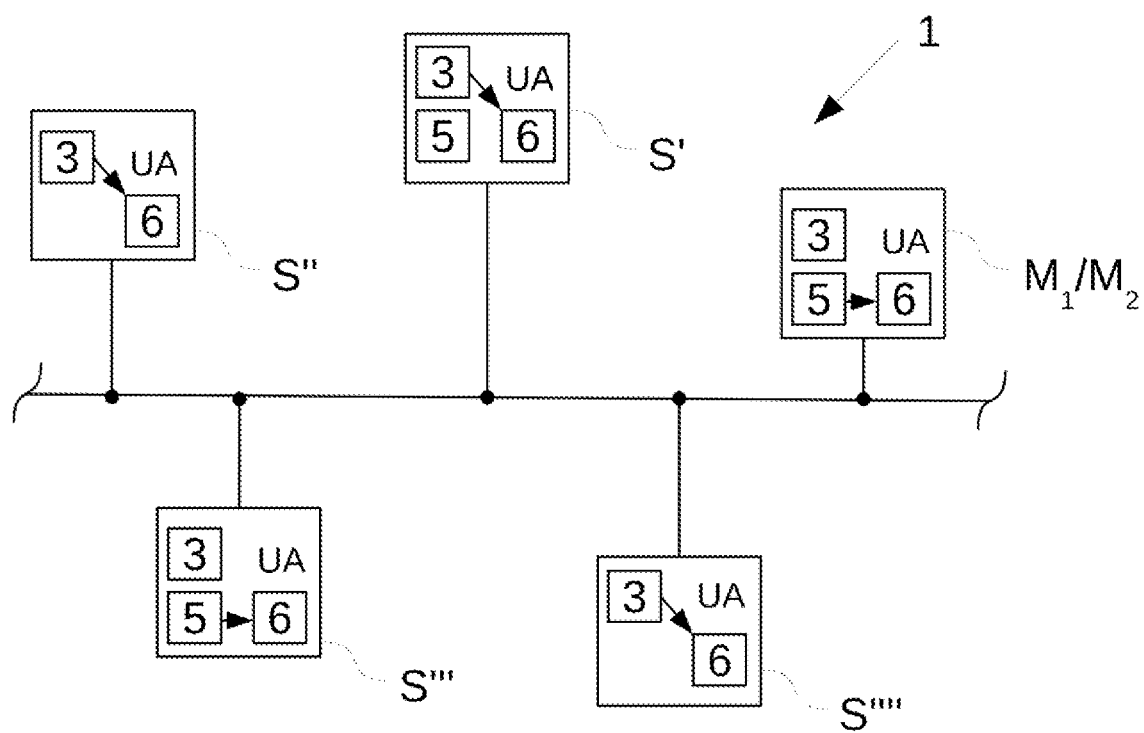
FIG. 5 shows how a timer works in a network with time synchronization according to the invention.

In a preferred embodiment, FIG. 5 shows a network 1 having timers 6 that use the time synchronization according to the invention. For the sake of clarity, both master roles $M_1$, $M_2$ are arranged in one network subscriber. The network subscribers are arranged in a network topology. According to the invention, the first and the second master $M_1$, $M_2$ send the synchronization messages $D_1$, $D_2$ via the network 1 to a plurality of slaves S. Each network subscriber, i.e., both the master $M_1$, $M_2$ and the slaves S with regard to time synchronization, has a timer 6. A timer 6 issues an interrupt request UA at regular intervals, for example, every 1 millisecond (ms). This can be particularly important for cyclic applications, which should take place on all network subscribers at the same time or in a specified sequence. For example, systems access the timer 6 for a production process and, in the simplest case, switch a valve to a specified interrupt request UA.

A timer 6 on each device must therefore issue the interrupt request UA after a certain time has elapsed. If the clock rates in the slaves S are different, the interrupt requests UA come at different times. This can, for example, trigger errors and problems in high-precision production processes.

In a network topology, there can be a large number of different network subscribers, such as processing units, bus modules, drive modules, bus couplers, IO modules having integrated network connections, cameras, HMI devices, network-integrated sensors and actuators and run on a wide variety of operating systems, such as Linux/Unix, Windows. Android and the like. Depending on the network subscriber and its operating system, a timer 6 accesses a working clock 3 or a global clock 5 based on the presets. Some network subscribers such as S" or S'" have only one working clock 3 and the timer 6 accesses the working clock 3 accordingly.

In the prior art, each timer 6 in the network 1 would have to be set in order to access a uniform clock, for example the global clock 5. However, this would cause problems for network subscribers without a global clock 5. As described above, in case of alignment with the working clock 3, the advantages of global time would be lost.

The time synchronization according to the invention allows a timer 6 in the network 1 to access any clocks in the network subscriber, and for the interrupt request UA to take place everywhere after the same period of time. In this way, the control of production processes, for example, can be planned and implemented with great precision.

The time synchronization mechanisms in the slaves can be implemented in particular by microprocessor-based hardware, microcontrollers, and/or integrated circuits (ASIC, FPGA), and can be implemented digitally, as software on microprocessor-based hardware. Thus, the time synchronization mechanism can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, and/or analog instrumentation, e.g., analog electric/electronic circuits, analog computers, analog devices, etc. Further, the processing of the signal from the transmitting subscriber can be implemented by microprocessors or similar components, programmed using software (e.g., microcode) to perform various functions discussed herein and may optionally be driven by firmware and/or software. Alternatively, the time synchronization mechanism may be implemented by dedicated hardware, or as a combination of dedicated hardware to perform some functions and a processor (e.g., one or more programmed microprocessors and associated circuitry) to perform other functions.

Moreover, the network can also include at least one memory (not shown). e.g., a non-transitory computer readable medium or media, to store one or more sets of instructions to perform any of the methods or computer-based functions disclosed herein, including operating the timers and timer synchronization mechanisms, either alone or in combination with the other described devices. The network can also include at least one processor that can access the at least one memory to execute the one or more sets of instructions to perform any of the methods or computer-based functions discussed above. Moreover, the at least one memory can be part of the slave or can be remote from the slave, e.g., a remotely located server, memory, system, or communication network or in a cloud environment, and the at least one processor can also part of the slave or remote from the slave.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for time synchronization in a network, the network comprising a plurality of masters and at least one slave having a first and second clock, the at least one slave receiving synchronization messages from the plurality of masters for time synchronization of the first clock and the second clock of the slave via the network, the method comprising:

sending a first synchronization message having a first time stamp from a first master to the at least one slave for time synchronization of the first clock and the at least one slave;

comparing the first time stamp of the first synchronization message with the first current time of the first clock;

based on this comparison of the first time stamp of the first synchronization message with the first current time of the first clock, calculating a clock rate and a time difference between the first clock and the first master and carrying out a time alignment in such a way that the first clock in the slave runs with a synchronized time;

a second master sending a second synchronization message having a second time stamp from the second master to the at least one slave for the time synchronization of the second clock, wherein a clock rate of the first clock is used to specify a clock rate for the second clock, by setting the clock rate of the second clock to the clock rate of the first clock;

comparing, in the at least one slave, the second time stamp of the second synchronization message with the second current time of the second clock; and, based on this comparison in the at least one slave, calculating a time difference between the second clock and the second master and carrying out a time alignment in such a way that the second clock in the slave runs with the synchronized time.

2. The method according to claim 1, wherein the time synchronization takes place at intervals of between 10 and 200 ms.

3. The method according to claim 1, wherein a time stamper is associated with at least one of the first clock or the second clock of the at least one slave and assigns a time stamp to a data packet.

4. The method according to claim 1, wherein the time synchronization takes place in the at least one slave via synchronization and a clock rate and a time difference are calculated, and the time difference between at least one of the first clock or the second clock and the master is compensated for by at least one of a time jump or a frequency alignment.

5. The method according to claim 1, wherein the time synchronization takes place in at least one slave via syntonization and a clock rate and a time difference are calculated, and the time difference between the at least one first clock or the second clock and the master is compensated for by adjusting the clock rate.

6. The method according to claim 1, wherein a timer is associated with at least one first clock or with a second clock and issues an interrupt request at regular intervals.

7. A network comprising:

a plurality of masters and at least one slave, the plurality of masters and the at least one slave each having a first clock and a second clock;

the first master being configured to send a first synchronization message having a first time stamp to the at least one slave, and the at least one slave being designed to calculate a clock rate and a first time difference relative to the first current time of the first clock in relation to the first master on the basis of the first time stamp and to carry out a time alignment in such a way that the first clock in the slave runs with a synchronized time;

the second master being configured to send a second synchronization message having a second time stamp to the at least one slave;

the at least one slave being designed to specify the clock rate of the first clock as a clock rate for the second clock, and to set the clock rate of the second clock to the clock rate of the first clock; and the at least one slave being designed to calculate a second time difference between the second current time of the second clock and the second master on the basis of the second time stamp and to carry out a time alignment in such a way that the second clock in the slave runs with the synchronized time.

* * * * *